July 21, 1959    S. M. TACKLIND ET AL    2,895,372
COLLIMATOR SIGHT
Filed Jan. 19, 1956

United States Patent Office 2,895,372
Patented July 21, 1959

2,895,372

COLLIMATOR SIGHT

Sven Magnus Tacklind, Johanneshov, and Georg Vogl, Bromma, Sweden, assignors to Svenska Ackumulator Aktiebolaget Jungner, Stockholm, Sweden, a corporation of Sweden Application January 19, 1956, Serial No. 560,207

Claims priority, application Sweden January 22, 1955

2 Claims. (Cl. 88—2.4)

In the use of mirrors for real optical reproduction systems are generally employed, wherein the center point of the image is located on the optical axis of the mirror. In this connection an obliquely positioned small mirror may be arranged near the image plane, or, a small mirror may be arranged with its optical axis coinciding with that of the main mirror, an aperture being then provided in the main mirror to admit the passage of the rays upon reflection against the small mirror. Obviously, a photographic plate or the eye of an observer, for instance, may also be located in the image plane of the main mirror or near said plane. In all these cases, a portion of the entrance pupil will be concealed by certain members and by the suspension means of such members. To avoid this a system called the Herschel-system has been proposed, wherein the mirror is obliquely positioned and the image may fall outside the entrance pupil. However, a system of this type shows great reproduction errors, particularly coma and astigmatism.

The present invention relates to an arrangement of an optical system, particularly for reflex sights, which comprises an optical system in accordance with Herschel, and which is distinguished by very small reproduction errors. The invention is characterized, above all, by the fact that an optical element which is asymmetric with respect to the principal ray is located near the image plane or the plane of the object. The principal ray is understood to be a ray emanating from the center point of the object and passing through the center of the mirror. This element is preferably constituted by a portion of a body of revolution, which is placed so that its axis of revolution is located in the proximity of the axis of rotation of the mirror or intersects this axis.

The optical system thus obtained may be used not only in reflex sights, i.e. as a collimator but, for instance, also in field glasses or in telescope projectors.

Figure 1:
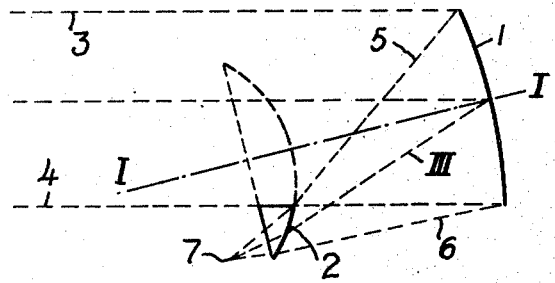
Figure 1A:
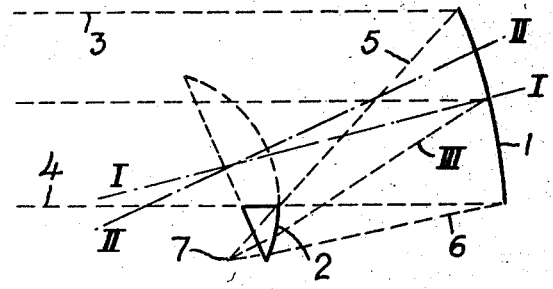
Figure 2:
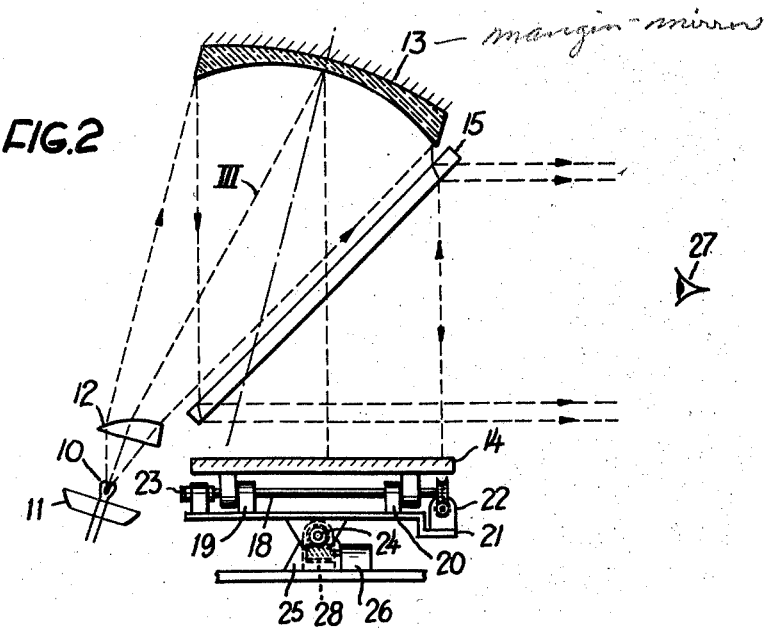

The invention will be elucidated further in the following description with reference to the accompanying drawing. In the drawing Fig. 1 diagrammatically illustrates the principle of the system, whereas Fig. 2 shows the optical system when used as a collimation device in a reflex sight, for instance for shooting at moving targets. Fig. 1a diagrammatically illustrates a case in which principal ray intersects the principal axis of the mirror and the optical axis of the optical correcting element is inclined with respect to the optical axis of the mirror.

In Fig. 1, 1 designates a concave-spherical mirror with the optical axis I—I.

Numeral 2 denotes an optical element which is asymmetric with respect to its optical principal axis, said element taking the form of a plane-convex lens. The cut off remaining portion of the lens is marked in Fig. 1 by dash lines, and, as will be seen, the conceived undivided lens has its principal axis coinciding with the principal axis I—I of the mirror 1.

Numeral 3 and numeral 4 denote two parallel incident rays striking the mirror 1. These rays are reflected by the mirror in the directions 5 and 6, respectively, and are refracted further by the plane-convex lens member 2 onto the point 7, wherein reproduction takes place. It can be shown by calculations or experiments that the most important optical errors disappear by the incorporation of the lens member 2.

Fig. 1a illustrates the same system as Fig. 1 but having the axis of revolution II—II of the optical element 2 inclined so as to intersect the optical axis I—I of the mirror I.

The principal ray is designated with III in the drawing throughout.

In Fig. 2, reference numeral 10 designates the luminous body of an incandescent lamp. Reference numeral 11 denotes a mirror which is symmetrically or concentrically located relatively to the luminous body, said mirror taking the form of a portion of an elliptic toroid, one focal point of which is located in the luminous body 10. This mirror reproduces the luminous body as a concentric ring. The luminous body and said ring are reproduced at an infinite distance by the present optical system, which consists of a lens member 12 and a Mangin-mirror 13. The sight also contains a cardanically suspended plane mirror 14 and an obliquely positioned transparent plate 15.

The mirror 14 is mounted on a shaft 18, which is in turn mounted on two bearing brackets 19 and 20, the latter being seated on a plate 21. Mounted on this plate are also a servo motor 22 and a first synchro device 23, i.e., an electrical angle receiver.

The plate 21 is secured on a shaft 24, which is mounted on two bearing brackets 25 fixed to the instrument. The shaft 24 is coupled to a servo-motor 26 and a second synchro device 28.

After the rays from the luminous body 10 have been parallelized by the optical system, they pass through the obliquely positioned plate 15 and are reflected to the oscillatable mirror 14 and then again strike the obliquely positioned plate 15, a portion of the radiation being then reflected by the surfaces of said plate. As a result an observer standing to the right in the figure, and having his eye at 27, will see a point and a ring concentric thereto at an infinite distance in one and the same direction, independently of where the eye is located within the limits marked by the rays shown as emanating from the plate 15. The point and the ring will be visible in a direction determined by the angular positions of the mirror 14, that is to say by the positions of the shafts 18 and 24. If the mirror is turned about the shaft 24 to the right as viewed in the figure, for example, the rays reflected therefrom will have an inclination to the right which is twice as great as the turning angle of the mirror, and the rays reflected from the plate 15 will be directed obliquely upwards. The eye will then see the point and the ring in a direction obliquely downwardly at an angle to the horizontal plane, viewed, according to the figure, said angle being twice as great as the turning angle of the shaft 24 from the position show in the figure.

In a sight according to Fig. 2, some reflexes will be produced in addition to the main radiation herein indicated, such reflexes causing so-called phantom images, some of which are stationary while some of them follow the main image. To protect the sight against water, dust, and so forth, it will also have to be provided with windows both on the front side and on the rear side thereof. These windows may cause further phantom images. All such phantom images become so weak, however, that they cannot have any disturbing effect. The phantom images may even be used as an indication of the fact that the lamplight is too intense relatively to the daylight. This involves that if the phantom image appears, the light-intensity of the lamp will have to be reduced.

The element 2 in Fig. 1 and Fig. 1a and the element 12 in Fig. 2 may, for instance, be biconvex lenses, concave mirrors, lens systems, or aspheric toroidal or cylindrical mirrors.

In the description and the drawing it has been assumed that angles of advance and elevation be calculated by some instrument and be transmitted as electric signals to synchro devices in the sight, such synchro devices then controlling the servo-motors 22 and 26, respectively, which adjust the mirror 14 into a position corresponding to the signals received. Obviously, the adjusment of the mirror may instead be effected by means of synchro devices for a direct angular transfer (without the use of servo) or by means of a mechanical counting device and mechanical adjustment. One may of course also make use of direct manual adjustment, a more or less advanced calculating device then giving the adjusting data.

The cardanic suspension of the mirror 14 may obviously be devised in different ways. In the illustrated case the suspension shafts are not in the same plane, and none of them is located in the plane of the mirror. It may be found advantageous to use, in place of the suspension shown, a more conventional cardanic suspension, wherein the shafts and the mirror are located in the same plane. An inherent advantage in this arrangement is that the mirror is not displaced in a parallel movement, whereby the size thereof may be reduced to some extent.

What we claim is:

1. A collimator sight comprising a sight mark, a concave mirror mounted obliquely relative to the principal ray extending between the center of the sight mark and the optical center of said mirror, an optical correcting element positioned intermediate said sight mark and said mirror adjacent said sight mark, said correcting element comprising a portion of a plano-convex body arranged asymmetrically with respect to said principal ray, the axis of revolution of said body being in the proximity of the axis of rotation of said mirror and the optical axis of said body intersecting the optical axis of said mirror, said concave mirror parallelizing the rays of light passing from the sight mark through said optical correcting element, an angularly adjustable mirror having a plane surface substantially normal to and in the path of the parallel light rays reflected from said concave mirror, and a transparent plate obliquely arranged intermediate said concave mirror and said adjustable mirror.

2. A collimator sight as defined in claim 1, and further including synchro means for adjusting the angularly adjustable mirror about two relatively normal axes.

References Cited in the file of this patent

UNITED STATES PATENTS

| | | |
|---|---|---|
| 1,355,805 | Banfield | Oct. 19, 1920 |
| 1,578,899 | Lohmann | Mar. 30, 1926 |
| 2,059,222 | Fessenden | Nov. 3, 1936 |
| 2,313,204 | Morelle | Mar. 9, 1943 |
| 2,336,379 | Warmisham | Dec. 7, 1943 |
| 2,358,316 | Chwalow | Sept. 19, 1944 |
| 2,379,167 | Lynn | June 26, 1945 |
| 2,382,631 | Harasta | Aug. 14, 1945 |
| 2,421,077 | Miller | May 27, 1947 |
| 2,425,400 | Schade | Aug. 12, 1947 |
| 2,490,747 | Creighton | Dec. 6, 1949 |

FOREIGN PATENTS

| | | |
|---|---|---|
| 412,579 | Great Britain | June 28, 1934 |